United States Patent [19]

Fujiwara et al.

[11] Patent Number: 4,605,285

[45] Date of Patent: Aug. 12, 1986

[54] ELECTROCHROMIC DEVICE

[75] Inventors: Ryoji Fujiwara, Sagamihara; Isamu Shimizu, Yokohama, both of Japan

[73] Assignee: Canon Kabushiki Kaisha, Tokyo, Japan

[21] Appl. No.: 593,490

[22] Filed: Mar. 26, 1984

[30] Foreign Application Priority Data

Apr. 1, 1983 [JP] Japan .................. 58-57211
Apr. 1, 1983 [JP] Japan .................. 58-57212
Apr. 1, 1983 [JP] Japan .................. 58-57213

[51] Int. Cl.$^4$ ............................................. G02F 1/17
[52] U.S. Cl. ............................ 350/357; 204/192 N
[58] Field of Search ............ 350/357; 204/192 N, 204/192 P; 427/39

[56] References Cited

U.S. PATENT DOCUMENTS 4,191,453 3/1980 Beni et al. .................... 350/357
4,258,984 3/1981 Beni et al. .................... 350/357
4,350,414 9/1982 Takahashi et al. ............ 350/357
4,416,517 11/1983 Beall et al. .................... 350/357

*Primary Examiner*—Norman Morgenstern
*Assistant Examiner*—K. Jaconetty
*Attorney, Agent, or Firm*—Fitzpatrick, Cella, Harper & Scinto

[57] ABSTRACT

An electrochromic device comprises an oxidative-coloration layer between a pair of electrodes, said oxidative-coloration layer being composed of a film of a metal oxyhydroxide represented by the formula:

$$MO_x(OH)_y$$

wherein M is a metal of group VIII of the periodic table, x is a number satisfying $0 < x < 1$, and y is a number satisfying $1 < y < 2$.

20 Claims, 10 Drawing Figures

ELECTROCHROMIC DEVICE

BACKGROUND OF THE INVENTION

1. Field of the Invention

This invention relates to a process for making an oxidative-coloration layer (a layer capable of forming color on oxidation) which is a component of an all solid-state electrochromic device.

2. Description of the Prior Art

The so-called electrochromic phenomenon is a change in a visible-ray absorption spectrum of a material, said change accompanying a reversible electrochemical reaction (oxidation-reduction reaction) caused by the application of electric signals. The display element utilizing this phenomenon is referred to as an electrochromic device (abbreviated as ECD). Attempts have long been made to develop a solid-state ECD and apply it to a superimposition indicator or aperture of a camera. A solid-state ECD comprising a cell of the structure: electrode/$WO_3$/$V_2O_5$·$Cr_2O_3$/$Cr_2O_3$ electrode reportedly has a life of $5 \times 10^6$ cycles or more (Japan, J. appl. phys., 19,2121(1980) and ibid., 20, 575(1981)).

However, the $Cr_2O_3$ layer used in the above cell is disadvantageous in that the layer itself is slightly colored even in the bleached state and therefore the light transmittance of the cell as a whole is lowered. A cell free from this drawback has been proposed, wherein an iridium hydroxide or nickel hydroxide layer which is transparent in the bleached state is employed in lieu of the $Cr_2O_5$ layer (U.S. Pat. No. 4,350,414).

The above iridium hydroxide and nickel hydroxide layers are formed by the reactive ion plating method. However, the formation of these hydroxides by this method involves knotty problems, and additionally the ECD thus prepared is insufficient in electrical responsiveness. Hence, practical use of these hydroxides are questionable.

SUMMARY OF THE INVENTION

An object of the invention is to provide an electrochromic device which overcomes the above noted drawbacks.

Another object of the invention is to provide an electrochromic device which is excellent in the transparency when color is eliminated.

A further object of the invention is to provide a method for making an oxidative-coloration layer of ECD, wherein the amount of hydroxyl group introduced into the layer can be controlled with ease.

According to the present invention, there is provided an electrochromic element comprising an oxidative-coloration layer between a pair of electrodes, said oxidative-coloration layer being composed of a film of a metal oxyhydroxide represented by the formula:

$$MOx(OH)y$$

wherein M is a metal of group VIII of the periodic table, x is a number satisfying $0 < x < 1$, and y is a number satisfying $1 < y < 2$.

DETAILED DESCRIPTION OF EMBODIMENTS OF THE INVENTION

Figure 1:
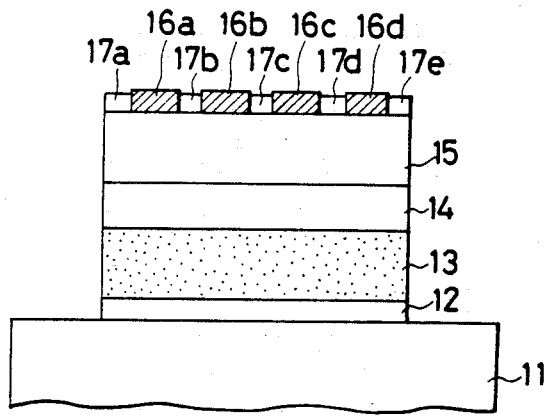
FIG. 1 is a cross-sectional view of an all solid-state electrochromic device.

The oxidative-coloration layer used in the invention can be made of a film of an oxyhydroxide of group VIII metal (MOx(OH)y, wherein M, x and y are as defined above), for example, nickel oxyhydroxide, cobalt oxyhydroxide or iron oxyhydroxide. This film of group VIII metal oxyhydroxide can be formed by reactive sputtering or reactive ion plating in an atmosphere of gas mixture of oxygen gas and hydrogen gas.

Referring now to the drawings, the invention is described in detail.

FIG. 1 illustrates an example of the structure of an ECD which is provided with a film of group VIII metal oxyhydroxide according to the invention. In this drawing, numeral 11 is a transparent substrate such as a glass plate or the like. This substrate 11 is overlaid successively with a transparent electrode 12 (e.g. an indium-tin oxide film or tin oxide film); an oxidative-coloration layer 13 composed of a group VIII metal oxyhydroxide; an electron-blocking diaphragm 14 of good proton conductor composed of an oxide (e.g. $ZrO_2$, SiO, $SiO_2$, or $Ta_2O_5$) or fluoride (e.g. LiF or $MgF_2$); a reductive-coloration layer 15 composed of a certain metal oxide (e.g. $WO_2$, $WO_3$, $MoO_2$, $MoO_3$ or $V_2O_5$); and transparent or translucent electrically conductive films 16a–16d (electrode) of e.g. Au. The conductive films may be formed by reactive ion plating or the like at a low temperature (up to 150° C.). Numerals 17a–17e represent protective layers.

Figure 2:
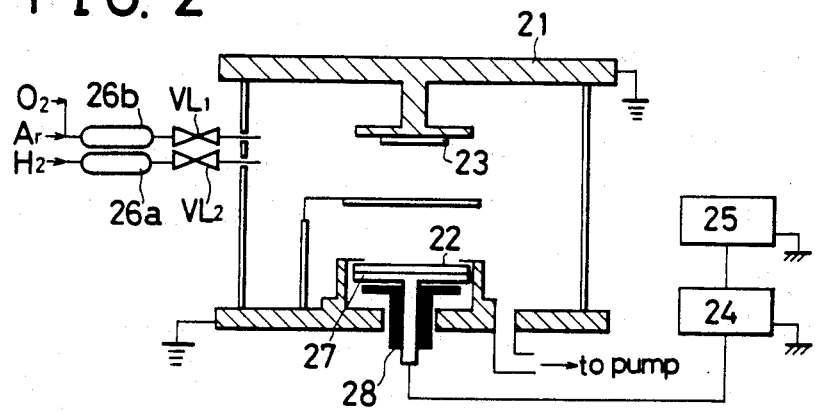
FIG. 2 is a schematic cross-sectional view of a reactive sputtering apparatus for making the film of group VIII metal oxyhydroxide to be used in the invention.

The oxidative-coloration layer 13, i.e. a film of group VIII metal oxyhydroxide, used in the invention can be formed by a reactive sputtering apparatus as shown in FIG. 2, wherein numeral 21 is a vacuum chamber, 22 is a target for sputtering, 23 is a substrate overlaid with a transparent electrode film, 24 is a matching box, 25 is a high-frequency power source, and 26a and 26b are bombs filled with reaction gases. For avoiding direct mixing of oxygen with hydrogen, it is desirable that one of the bombs be filled with an argon-oxygen mixed gas and the other with hydrogen and that the oxygen and hydrogen gases be mixed in the vacuum chamber under a low pressure. The substrate 23 such as a glass plate, having thereon a transparent electrode and the target 22 made of a group VIII metal or oxide thereof are disposed in place in the vacuum chamber 21. The target 22 is fixed on an electrode 27 such as stainless steel which is connected through the matching box 24 to the high-frequency power source 25. To the vacuum chamber 21 are connected the reaction-gas filled bombs 26a and 26b for introducing hydrogen gas and a mixture of oxygen gas and inert gas (argon gas), respectively, and a vacuum pumping system. The electrode 27 is electrically insulated with an insulator 28.

When the oxidative-coloration layer made of a group VIII metal oxyhydroxide is formed according to the invention, the vacuum chamber 21 is evacuated to a vacuum of $10^{-5}$ Torr or less by operating the vacuum line, and valves $VL_1$ and $VL_2$ are then opened to introduce hydrogen gas and the mixture of oxygen gas and inert gas into the vacuum chamber, where the total pressure is controlled to 0.1 Torr or less (0.01–0.1 Torr); then a high-frequency power (frequency 13.56 MHz, power 150 W) is applied to the electrode 27 to generate a glow discharge; thus the sputtering is carried out to form a group VIII metal oxyhydroxide film on the substrate 23.

Figure 3A:
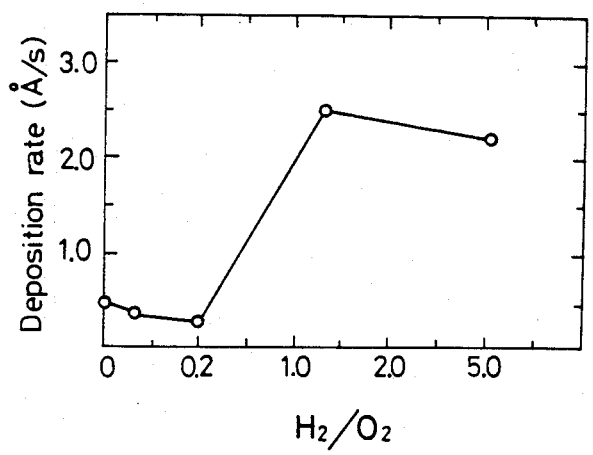
FIG. 3A shows deposition rates of group VIII metal oxyhydroxide to be used in the invention.
Figure 3B:
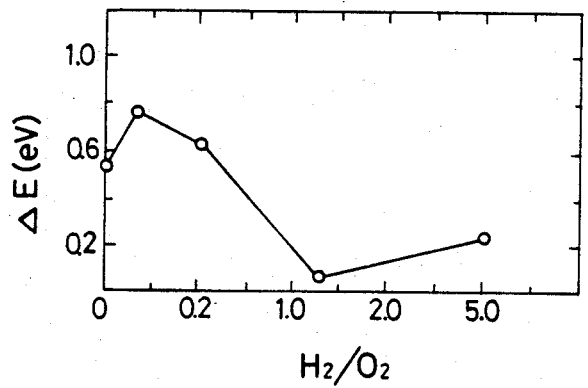
FIGS. 3B–3D, 4, 5 and 6 illustrate physical properties of the group VIII metal oxyhydroxide film.
Figure 3C:
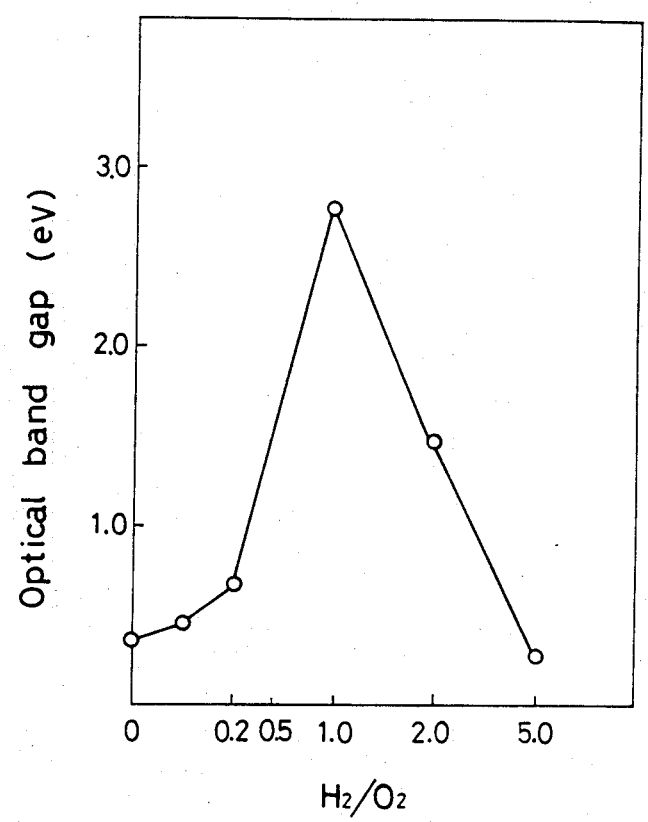
Figure 3D:
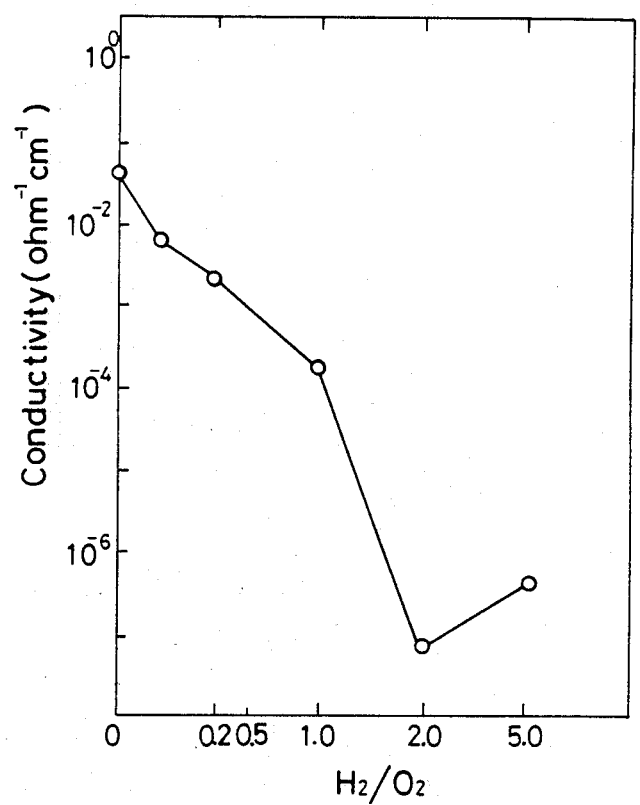
Figure 4:
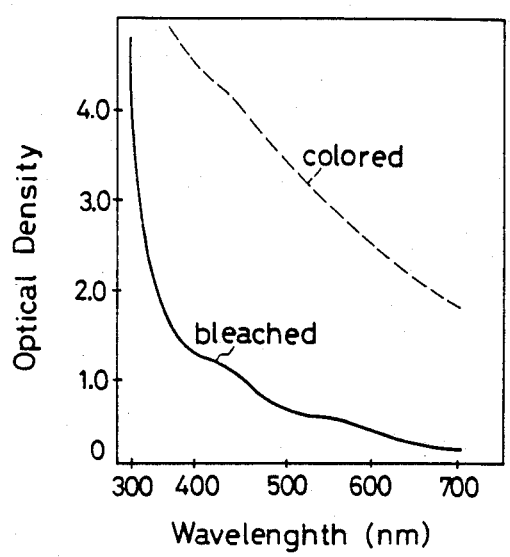
Figure 5:
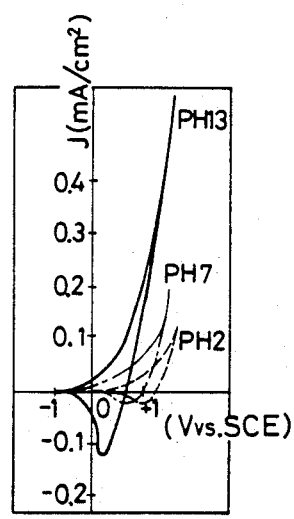

FIG. 3A shows deposition rates of nickel oxyhydroxide films, and FIGS. 3B–3D show physical properties thereof, when these films were formed by the 1-hour sputtering under the conditions that the high-frequency power was 150 W, and the pressure of the mixture of oxygen and hydrogen gases was kept at 0.1 Torr. These graphs indicate that the physical properties of the nickel oxyhydroxide film vary largely as the $H_2/O_2$ volume ratio is in the range of ca. 0.5 to ca. 2. Nickel oxyhydroxide films obtained in this range of $H_2/O_2$ volume ratio exhibit good ED characteristics (color forming and eliminating characteristics). In particular, nickel oxyhydroxide films, as shown in FIG. 3C, have high transmittance, and as shown in FIG. 3D, have high electric conductivity, when formed in the range of $H_2/O_2$ volume ratio of 0.5 to 2, especially 1 to 2. As an example, FIG. 4 shows absorption spectra of a nickel oxyhydroxide film in the colored and bleached states. FIG. 5 shows cyclic voltammogram of a nickel oxyhydroxide film under various pH conditions. With increasing pH value or basicity, the current due to the anode reaction increases. The reversible coloring-bleaching reaction of the nickel oxyhydroxide film is assumed as follows:

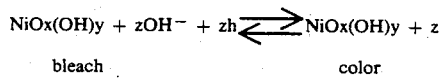

wherein h represents a hole; $0<x<1$, preferably $0<x<0.5$; $1<y<2$; and $2<x+y+z<3$. That is to say, nickel in the nickel oxyhydroxide film used in the invention has a valency of 2 in the bleached state. The film can be colored by the electrochemical oxidation of the divalent nickel into the trivalent nickel.

The aforementioned nickel hydroxide film, disclosed in U.S. Pat. No. 4,350,414, contains no oxygen in the molecule except the oxygen of hydroxyl group so that the nickel exhibits a low rate of the electrochemical transition from the divalent state to the trivalent, and the response speed is hence low.

In contrast to this, the nickel oxyhydroxide film according to the invention is characterized in that the compound of the film has oxygen besides the oxygen of hydroxyl group and the former oxygen promotes the electrochemical transition of nickel from the divalent state to the trivalent.

In another preferred embodiment of the invention, cobalt (Co) or iron (Fe) can be used as a metal of group VIII other than nickel, for constituting the metal oxyhydroxide film.

Figure 6:
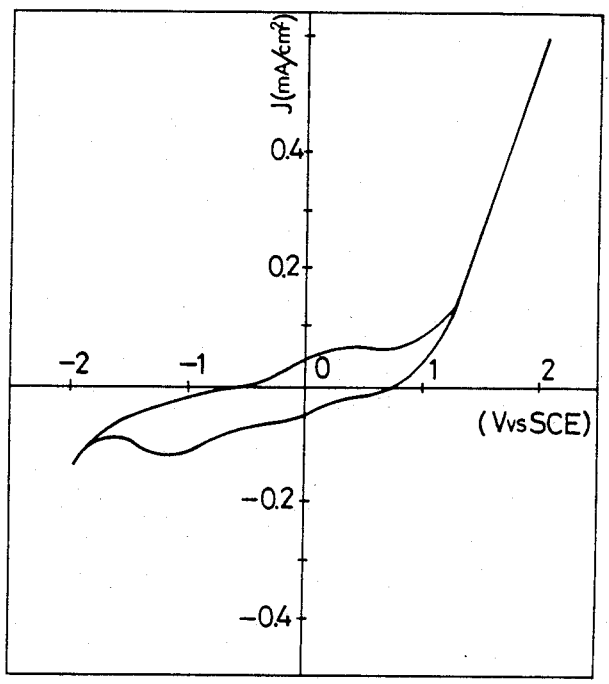

The reversible coloring-bleaching reaction of the cobalt oxyhydroxide film is assumed as follows:

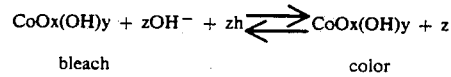

wherein h represents a hole; $0<x<1$, preferably $0<x<0.5$; $1<y<2$; and $2<x+y+z<3$. A cyclic voltammogram of this cobalt oxyhydroxide film is shown in FIG. 6.

The reversible coloring-bleaching reaction of the iron oxyhydroxide film is also assumed as follows:

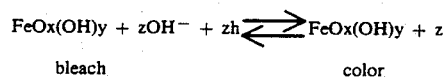

wherein h, x, y and z are as defined above.

In the above cobalt or ion oxyhydroxide film, oxygen in the molecule except the oxygen of hydroxyl group has the function or effect of promoting the oxidation of the divalent cobalt or ion into the trivalent, so that the film exhibits an increased response speed as compared with films which are analogous but contain no such oxygen in the molecule. In particular, when the oxygen content is set in the range of $0<x<0.5$, a film excellent in transparency in the bleached state can be obtained.

Figure 7:
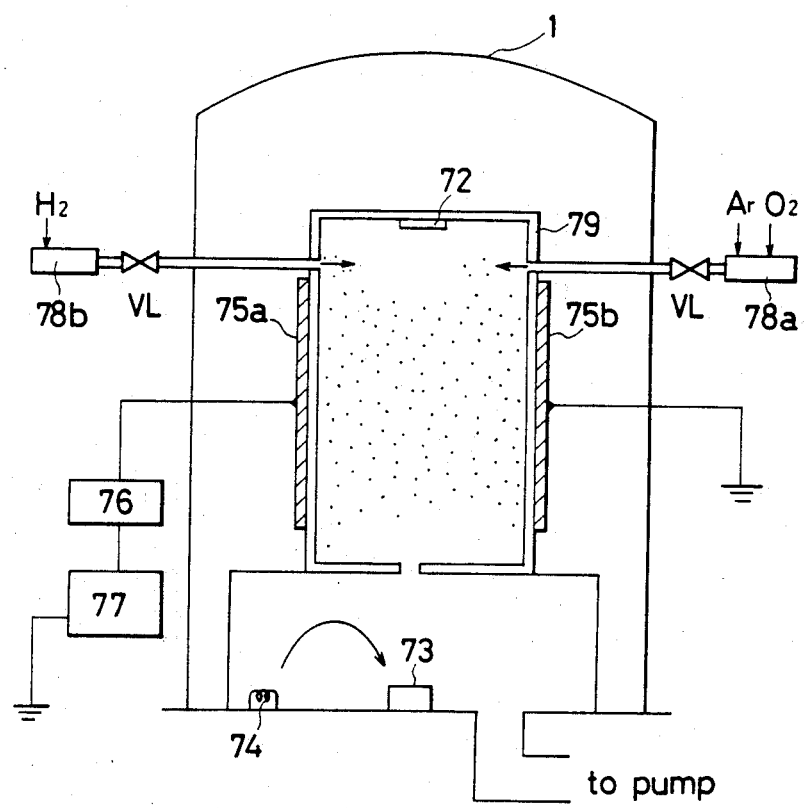
FIG. 7 is a schematic cross-sectional view of a reactive ion plating apparatus for making the film of group VIII metal oxyhydroxide to be used in the invention.

FIG. 7 illustrates another type of apparatus for making a film of group VIII metal oxyhydroxide. In the drawing, numeral 71 is a vacuum chamber, 72 is substrate, 73 is an evaporation source, 74 is an electron gun, 75a and 75b are electrodes, 76 is a matching box, 77 is a high-frequency power source, 78a and 78b are reaction gas bombs, and 79 is an inner vacuum chamber. This apparatus is one kind of reactive ion plating apparatus, wherein the electrodes are of a capacitive coupling type and another vacuum chamber is disposed in the vacuum chamber of larger size. Thus, this is a differential pumping capacitive coupling high frequency glow discharge reactive ion plating apparatus. With this system, the content of hydroxyl group in the film can be controlled more easily than with the reactive sputtering system shown in FIG. 2. According to the usual RF (high frequency) flow discharge reactive ion plating method, film formation is infeasible under a pressure higher than $5\times10^{-4}$ Torr since the electron gun cannot be used (glow discharge cannot be generated) under such pressure. In contrast, according to this reactive ion plating method of the invention, the film can be successfully formed by generating a glow discharge under a vacuum degree of $5\times10^{-4}$ Torr or lower while keeping the atmosphere of gas mixture of hydrogen and oxygen gases in the inner vacuum chamber 79 at a higher pressure of 0.01 to 0.1 Torr. Also in this case, suitable $H_2/O_2$ volume ratios are 0.5 to 2, particularly 1 to 2.

As described hereinbefore, it is possible according to the invention to provide an oxidative-coloration layer for ECD which has satisfactory performance characteristics, by using as the layer a film of group VIII metal oxyhydroxide such as $NiO_x(OH)_y$, $CoO_x(OH)_y$, or $FeO_x(OH)_y$ in place of the prior art film of metal hydroxide such as nickel hydroxide. This film of oxyhydroxide can be formed by reactive sputtering or reactive ion plating using a gaseous mixture of oxygen and hydrogen with ease and good reproducebility.

The invention is illustrated further referring to the following examples.

EXAMPLE 1

A 0.8-mm thick glass substrate provided with an ITO film and a nickel metal plate were set in a sputtering apparatus as shown in FIG. 2. The vacuum chamber of the apparatus was evacuated by driving the vacuum pump, hydrogen gas and oxygen-argon mixed gas ($H_2/O_2$ volume ratio=1) were introduced into the vacuum chamber, and the pressure of the mixed gas in the chamber was adjusted to 0.08 Torr. Then, a high-frequency power (13.56 MHz, 150 W) was applied to the electrode to cause sputtering, thus forming a 350-Å thick $NiO_x(OH)_y$ film on the ITO film.

Thereafter, this $NiO_x(OH)_y$ film was overlaid with a 3000-Å thick $Ta_2O_5$ film by vacuum deposition method at a deposition rate of 8 Å/sec. under a vacuum of $2.1 \times 10^{-5}$ Torr. Further, this film was overlaid with a 4000-Å thick $WO_3$ film as a reductive-coloration layer and then with a 300-Å thick translucent Au film, by vacuum deposition method. Thus, an ECD was prepared.

A d.c. voltage of 2.2 V was applied to the electrodes (the ITO film as positive pole and the translucent Au film as negative pole) of the ECD for 0.2 sec. to form a color, and then the polarity was reversed to eliminate the color, where the optical densities in the colored state and in the bleached state were measured in the wavelength region of 300 to 700 nm. Results of the measurement are shown in FIG. 4.

EXAMPLES 2 and 3

ECD's were prepared and tested in the same manner as in Example 1 but using metallic cobalt and metallic iron respectively in place of the metallic nickel. Similar results were obtained.

What we claim is:

1. An electrochromic device comprising an oxidative-coloration layer between a pair of electrodes, said oxidative-coloration layer being composed of a film of a metal oxyhydroxide represented by the formula:

$MO_x(OH)_y$ wherein M is a metal of group VIII of the periodic table, x is a number satisfying $0 < x < 1$, and y is a number satisfying $1 < y < 2$.

2. The electrochromic device of claim 1, wherein the metal oxyhydroxide is selected from the group consisting of nickel oxyhydroxide, cobalt oxyhydroxide and iron oxyhydroxide.

3. An electrochromic device comprising an oxidative-coloration layer, an electron-blocking diaphragm of good proton conductor and a reductive-coloration layer between a pair of electrodes, said oxidative-coloration layer being composed of a film of a metal oxyhydroxide represented by the formula:

$MO_x(OH)_y$ wherein M is a metal of group VIII of the periodic table, x is a number satisfying $0 < x < 1$, and y is a number satisfying $1 < y < 2$.

4. The electrochromic device of claim 3, wherein the metal oxyhydroxide is selected from the group consisting of nickel oxyhydroxide, cobalt oxyhydroxide and iron oxyhydroxide.

5. The electrochromic device of claim 3, wherein the reductive-coloration layer is a film of at least one oxide selected from the group consisting of tungsten dioxide, tungsten trioxide, molybdenum dioxide, molybdenum trioxide and divanadium pentaoxide.

6. The electrochromic device of claim 3, wherein the electron-blocking diaphragm of good proton conductor is a film of either at least one oxide selected from the group consisting of zirconium dioxide, silicon oxide, silicon dioxide and ditantalum pentaoxide, or at least one fluoride selected from the group consisting of lithium fluoride and magnesium fluoride.

7. An electrochromic device comprising an oxidative-coloration layer between a pair of electrodes, said oxidative-coloration layer being composed of a film of $MO_x(OH)_y$ wherein M is a metal of group VIII of the periodic table, x is a number satisfying $0 < x < 1$, and y is a number satisfying $1 < y < 2$, and said film being formed by sputtering the metal of group VIII of the periodic table in a gas mixture containing oxygen and hydrogen gases.

8. The electrochromic device of claim 7, wherein the pressure of the gas mixture is up to 0.1 Torr.

9. The electrochromic device of claim 7, wherein the hydrogen/oxygen volume ratio in the gas mixture is in the range of 0.5 to 2.

10. The electrochromic device of claim 7, wherein the hydrogen/oxygen volume ratio in the gas mixture is in the range of 1 to 2.

11. The electrochromic device of claim 7, wherein inert gas is admixed with the gas mixture.

12. The electrochromic device of claim 11, wherein the inert gas is argon gas.

13. The electrochromic device of claim 7, wherein the metal is selected from the group consisting of nickel, cobalt and iron.

14. An electrochromic device comprising an oxidative-coloration layer between a pair of electrodes, said oxidative-coloration layer being composed of a film of $MO_x(OH)_y$ wherein M is a metal of group VIII of the periodic table, x is a number satisfying $0 < x < 1$, and y is a number satisfying $1 < y < 2$, and said film, being formed from the metal of group VIII of the periodic table by a differential pumping capacitive coupling high-frequency glow discharge reactive ion plating in a gas mixture containing oxygen and hydrogen gases.

15. The electrochromic device of claim 14, wherein the atmosphere in which the glow discharge is generated is kept at a vacuum degree of $5 \times 10^{-4}$ Torr or lower and the atmosphere of the gas mixture in which the vapor deposition onto the substrate is carried out is kept at a pressure of 0.01 to 0.1 Torr.

16. The electrochromic device of claim 14, wherein the hydrogen/oxygen volume ratio in the gas mixture is in the range of 0.5 to 2.

17. The electrochromic device of claim 14, wherein the hydrogen/oxygen volume ratio in the gas mixture is in the range of 1 to 2.

18. The electrochromic device of claim 14, wherein inert gas is admixed with the gas mixture.

19. The electrochromic device of claim 18, wherein the inert gas is argon gas.

20. The electrochromic device of claim 14, wherein the metal is selected from the group consisting of nickel, cobalt and iron.

* * * * *